United States Patent
Doubrere (10) Patent No.: US 9,926,087 B2
(45) Date of Patent: Mar. 27, 2018

(54) SATELLITE COMPRISING ELECTRICAL PROPULSION MEANS, METHOD FOR PLACING SUCH A SATELLITE IN A STATION AND METHOD FOR KEEPING SAID SATELLITE IN ITS STATION

(71) Applicant: AIRBUS DEFENCE AND SPACE SAS, Toulouse (FR)

(72) Inventor: Patrick Doubrere, Toulouse (FR)

(73) Assignee: Airbus Defence and Space SAS, Toulouse (FR)

( * ) Notice: Subject to any disclaimer, the term of this patent is extended or adjusted under 35 U.S.C. 154(b) by 0 days.

(21) Appl. No.: 15/549,165

(22) PCT Filed: Feb. 9, 2016

(86) PCT No.: PCT/EP2016/052710
§ 371 (c)(1),
(2) Date: Aug. 6, 2017

(87) PCT Pub. No.: WO2016/128389
PCT Pub. Date: Aug. 18, 2016

(65) Prior Publication Data
US 2018/0029727 A1 Feb. 1, 2018

(30) Foreign Application Priority Data
Feb. 10, 2015 (FR) ...................... 15 51034

(51) Int. Cl.
*B64G 1/10* (2006.01)
*B64G 1/40* (2006.01)
(Continued)

(52) U.S. Cl.
CPC ............... *B64G 1/40* (2013.01); *B64G 1/007* (2013.01); *B64G 1/242* (2013.01)

(58) Field of Classification Search
CPC . B64G 1/242; B64G 1/26; B64G 1/40; B64G 1/007; F02K 9/84; F05D 2270/12
See application file for complete search history.

(56) References Cited

U.S. PATENT DOCUMENTS

| 5,312,073 A | 5/1994 | Flament et al. |
| 5,339,623 A * | 8/1994 | Smith ...................... B64G 1/26 |
| | | 60/203.1 |

(Continued)

FOREIGN PATENT DOCUMENTS

| EP | 2 660 154 A2 | 11/2013 |
| EP | 2 666 723 A1 | 11/2013 |

(Continued)

OTHER PUBLICATIONS

Brophy, "The Dawn Ion Propulsion System," Space Science reviews, Nov. 16, 2011, pp. 251-261, vol. 163, No. 1-4, Kluwer Academic Publishers.

*Primary Examiner* — Philip J Bonzell
(74) *Attorney, Agent, or Firm* — Im IP Law; C. Andrew Im (57) ABSTRACT

A satellite, intended to be placed in a station in orbit about a celestial body, including a first electrical thruster of orientatable thrust direction, a second electrical thruster of orientatable thrust direction, and an electrical thruster of fixed orientation that is fixed with respect to the satellite and of line of thrust passing through the center of gravity of the satellite. The satellite includes two electrical-thruster power units and an electrically interconnecting network connecting a first power unit to the first thruster of orientatable thrust direction and to the thruster of fixed orientation, and connecting a second power unit to the second thruster of orientatable thrust direction and to the thruster of fixed orientation. Each of the power units is configured to power (Continued)

either the associated thruster of orientatable thrust direction or the thruster of fixed orientation.

19 Claims, 3 Drawing Sheets

(51) Int. Cl.
*B64G 1/24* (2006.01)
*B64G 1/00* (2006.01)

(56) References Cited

U.S. PATENT DOCUMENTS

| | | | |
|---|---|---|---|
| 5,443,231 A | 8/1995 | Anzel | |
| 5,947,421 A * | 9/1999 | Beattie | F03H 1/0037 244/171.1 |
| 6,032,904 A * | 3/2000 | Hosick | B64G 1/26 244/169 |
| 9,387,942 B2 * | 7/2016 | Celerier | B64G 1/242 |
| 9,527,607 B2 * | 12/2016 | Celerier | B64G 1/405 |
| 9,573,703 B2 * | 2/2017 | Celerier | F02K 9/84 |
| 2013/0292516 A1 | 11/2013 | Celerier | |
| 2013/0313369 A1 | 11/2013 | Celerier | |
| 2014/0361123 A1 * | 12/2014 | Celerier | B64G 1/40 244/158.6 |
| 2014/0361124 A1 * | 12/2014 | Celerier | B64G 1/242 244/158.6 |
| 2017/0129627 A1 * | 5/2017 | Moro | B64G 1/242 |

FOREIGN PATENT DOCUMENTS

| | | |
|---|---|---|
| EP | 2 727 844 A2 | 5/2014 |
| WO | 92/09479 A2 | 6/1992 |

* cited by examiner

SATELLITE COMPRISING ELECTRICAL PROPULSION MEANS, METHOD FOR PLACING SUCH A SATELLITE IN A STATION AND METHOD FOR KEEPING SAID SATELLITE IN ITS STATION

RELATED APPLICATIONS

This application is a § 371 application from PCT/EP2016/052710 filed Feb. 9, 2016, which claims priority from French Patent Application No. 15 51034 filed Feb. 10, 2015, each of which is incorporated herein by reference in its entirety.

FIELD OF THE INVENTION

The field of present invention is that of placing a spacecraft, more particularly a satellite, in station and keeping it on station in its mission orbit around a celestial body. The invention more particularly concerns a satellite intended to be placed in station in a mission orbit around a celestial body and a method of transferring a satellite of this kind from an initial orbit into said mission orbit and a method for orbit and attitude control of such a satellite in said mission orbit.

The invention finds a particularly advantageous but non-limiting application for telecommunication satellites intended to be placed in geostationary orbit (GEO) and equipped with electrical propulsion means.

BACKGROUND OF THE INVENTION

Spacecraft such as artificial satellites are intended to be stationed in orbit around a celestial body, in particular in Earth orbit, notably in geostationary orbit, in order to carry out their mission there, for example telecommunications, Earth observation, etc. Placing in station is usually carried out in two stages. The first stage consists in launching the satellite into space, notably from the surface of the Earth, by means of a specifically dedicated vehicle commonly called a launch vehicle, and injecting it into an initial orbit called the injection orbit. In the second stage, the satellite is transferred from this injection orbit to its mission orbit, also called its final orbit.

As is known in itself, in its mission orbit, notably in Earth orbit, a satellite is subjected to numerous disturbances. Those disturbances tend on the one hand to move the satellite relative to a set point position in its orbit and on the other hand to modify the attitude of said satellite relative to a set point attitude. In order to maintain the satellite substantially in the set point position and substantially in the set point attitude it is necessary to perform orbit control and attitude control of said satellite.

Orbit control consists in limiting variations of the orbital parameters. In the case of a GEO satellite, such as a telecommunication satellite, orbit control consists in controlling the position of the satellite relative to the Earth in terms of inclination, longitude and eccentricity, and is also known as station keeping (S/K).

Orbit control of a GEO satellite is generally effected by means of a plurality of orbit control maneuvers during which thrusters of the satellite are activated. Orbit control of the satellite is effected by adjusting the thrust forces produced by said thrusters during various orbit control maneuvers. A plurality of orbit control maneuvers are conventionally effected:

north/south (N/S) maneuvers enable control of the inclination of the orbit of the satellite, east-west (E/W) maneuvers enable control of the longitude of the orbit of the satellite.

For its part, eccentricity can be controlled during E/W maneuvers or N/S maneuvers.

It is possible to define a satellite frame of reference centered on a center of mass of this satellite and comprising three axes X, Y and Z: when the satellite is on station in its mission orbit, the axis X is parallel to a speed vector of the satellite, the axis Z is directed toward the Earth, and the axis Y is orthogonal to the axes X and Z. In the satellite frame of reference, N/S maneuvers necessitate thrust forces along the axis Y whereas E/W maneuvers necessitate thrust forces along the axis X. In the present description, the center of mass of the satellite means the theoretical center of mass of the satellite; its real center of mass can vary slightly over time as a function of the quantity of propellants in the tanks, the position/orientation of the equipments of the payload, etc.

Satellites are conventionally equipped with propulsion means able to perform on the one hand their transfer from the initial orbit to the mission orbit and on the other hand their station keeping in that mission orbit. These propulsion means can be of chemical type. Recently electrical propulsion has been used instead of chemical propulsion to carry out the transfer and station keeping of satellites because it enables better performance to be achieved compared to chemical propulsion.

Prior art satellites using electrical propulsion means employ electrical thrusters the thrust direction of which can be oriented by a mechanism. Orienting the thrusters notably makes it possible to control the position of the thrust direction relative to the center of mass of the satellite and to change from a configuration appropriate for the electrical transfer, in which all the thrusters are oriented along the same axis in the plane XZ (generally the axis Z of the satellite frame of reference) to a configuration appropriate for station keeping.

By way of example, the U.S. Pat. No. 5,443,231A describes a satellite comprising four electrical thrusters each mounted on a mechanism enabling orientation of its thrust direction. The orbital transfer and station keeping of this satellite are effected by simultaneous or sequential use of two thrusters disposed diagonally, both in nominal mode and in failure mode. However, a system of this kind is lacking in robustness, situations in which two thrusters disposed on the same side of the satellite become faulty being particularly penalizing for the mission of the satellite. Moreover, the maneuvers necessary for orbit and attitude control of such a satellite can prove complicated, notably where the control of eccentricity is concerned, and they are in particular liable to generate moments that can modify the attitude of the satellite, which it is necessary to remedy.

OBJECT AND SUMMARY OF THE INVENTION

The present invention aims to propose a satellite with electrical propulsion means that makes it possible to carry out more simply and effectively a large number of different satellite orbit and attitude control maneuvers.

A supplementary objective of the invention is for this satellite to have the benefit of a high level of robustness in the event of failure of thrusters and/or electrical-thruster power and control units, at the same time as having limited mass and limited cost.

The invention also aims to make it possible for the phase of transferring this satellite from the initial orbit to the mission orbit to be carried out rapidly.

There is therefore proposed in accordance with the present invention a satellite intended to be stationed in a mission orbit around a celestial body, notably an Earth orbit, in particular a geostationary orbit, comprising, in a manner that is conventional in itself, a face called the Earth face intended to be disposed facing the Earth when the satellite is on station, and an opposite anti-Earth face, said satellite defining a satellite frame of reference centered on a center of mass of the satellite and comprising three axes X, Y and Z, the axis Z being intended to be directed toward the Earth when the satellite is on station, the axis X being parallel to a speed vector of the satellite, and the axis Y being orthogonal to the axe X and Z. This satellite comprises:

propulsion means comprising a first electrical thruster of orientable thrust direction and a second electrical thruster of orientable thrust direction, at least two electrical-thruster power units, and an electrically interconnecting network connecting a first electrical-thruster power unit to the first electrical thruster of orientable thrust direction and a second electrical-thruster power unit to the second electrical thruster of orientable thrust direction.

A power unit, commonly called a PPU (Power Processing Unit) is defined in the present description, in a manner that is conventional in itself, as an electronic unit that provides a main power supply appropriate for the operation and control of an electrical thruster.

The first electrical thruster of orientable thrust direction and the second electrical thruster of orientable thrust direction are able to be placed in a configuration adapted to enable them to carry out together the orbit transfer of the satellite from the initial orbit to the mission orbit, i.e. can be moved in the satellite frame of reference so as to orient their thrust directions appropriately to carry out the phase of transfer of the satellite from the initial orbit into the mission orbit. In particular, the first electrical thruster of orientable thrust direction and the second electrical thruster of orientable thrust direction are able to be placed so as to simultaneously orient their thrust direction in the plane XZ in the satellite frame of reference, their components along Z being in the same direction. The first electrical thruster of orientable thrust direction and the second electrical thruster of orientable thrust direction are notably able to be placed so as to simultaneously orient their thrust direction along the axis Z.

The satellite according to the invention is moreover such that the propulsion means also comprise an electrical thruster of fixed orientation relative to the satellite, having a thrust line substantially aligned along the axis Z and passing through the center of mass of the satellite. By substantially aligned it is meant the fact that the thrust line can equally well be parallel to (or coincide with) the axis Z or inclined a few degrees relative to the axis Z. The electrically interconnecting network connects each of the first electrical-thruster power unit and the second electrical-thruster power unit to the electrical thruster of fixed orientation so that each of said power units is able to power either the associated electrical thruster of orientable thrust direction or the electrical thruster of fixed orientation, depending on the particular requirements of the mission.

The electrical thruster of fixed orientation can advantageously be used for the satellite orbit and attitude control maneuvers, both in nominal operating mode and in the event of failure of one or more electrical thrusters of orientable thrust direction, and in particular for the eccentricity control maneuvers. A substantially zero moment is advantageously applied to the satellite by this thruster of fixed orientation when the real center of mass of the satellite is close to its theoretical center of mass.

Moreover, in connection with this electrical thruster of fixed orientation, the particular configuration of the electrically interconnecting network of the satellite according to the invention on the one hand advantageously provides redundancy in the event of failure of the electrical thruster of orientable thrust direction and on the other hand allows a greater diversity of maneuvers to be carried out by the propulsion means of the satellite, the power supplied by each electrical-thruster power unit being assignable either to the associated electrical thruster of orientable thrust direction or to the electrical thruster of fixed orientation, depending on what is required.

Accordingly, in the event of failure of an electrical thruster of orientable thrust direction, the power unit associated with that inoperative thruster can be used to power the electrical thruster of fixed orientation. The switch from supplying power to the inoperative thruster to the fixed thruster is advantageously easy and rapid.

In particular, during the phase of transfer of the satellite from the initial orbit to the emission orbit, in the event of failure of an electrical thruster of orientable thrust direction, the transfer can advantageously continue by means of the electrical thruster of fixed orientation and of the electrical thruster of orientable thruster direction that remains operational. To this end, the thrust of the latter is oriented substantially toward the center of mass of the satellite. The resulting total thrust is then greater than or equal to 90% of the thrust in nominal mode, i.e. the thrust produced simultaneously by the first electrical thruster of orientable thrust direction and the second electrical thruster of orientable thrust direction.

During the phase of orbit and attitude control of the satellite, the electrical thruster of fixed orientation can also and advantageously be used to carry out eccentricity control instead of an electrical thruster of orientable thrust direction in the event of failure of the latter.

These advantageous results are obtained with only three electrical thrusters in total and two power units, whereas to provide the same degree of redundancy the prior art employs four electrical thrusters of orientable thrust direction operating in pairs.

The first electrical thruster of orientable thrust direction and the second electrical thruster of orientable thrust direction are advantageously configured so that they are able to exert each a thrust along the axis Z in the satellite frame of reference simultaneously and in the same direction so as to enable them to carry out efficiently the orbit transfer of the satellite from the initial orbit to the final orbit.

The first electrical thruster of orientable thrust direction and the second electrical thruster of orientable thrust direction are moreover preferably configured so that each is able to exert a thrust comprising, in the satellite frame of reference, a non-zero component along the axis Z and/or a non-zero component along the axis Y. The thrust exerted by this first thruster and the thrust exerted by this second thruster are preferably in opposite directions along the axis Y.

The first electrical thruster of orientable thrust direction and the second electrical thruster of orientable thrust direction are moreover preferably disposed on different faces of the satellite, notably on opposite faces of the satellite, for example one on a face conventionally called the north face of the satellite and the other on a face conventionally called the south face.

Particular embodiments of the invention also have the following features separately or in each of their technically operative combinations.

Generally speaking, apart from the particular features described above and hereinafter, notably concerning its propulsion means, the satellite itself is conventional. It may notably comprise payloads, solar energy collection means, in the form of solar panels, which are generally deployable, communication means using antennas with deployable reflectors, and a service module providing its basic functions and notably comprising electrical power, control and navigation, telemetry and communication, etc. systems together with the associated electrical wiring. It also contains a sufficient reserve of propellant for the orbit transfer and station keeping maneuvers, as well as if necessary for the orbit change maneuvers to transfer it at the end of life into its cemetery orbit. All of these elements are well known to the person skilled in the art and will not be described in detail in the present description.

In particular embodiments of the invention, the electrical thruster of fixed orientation is disposed on the anti-Earth face of the satellite. It therefore does not in any way impede the placement and deployment of the instruments of the payload of the satellite, which are conventionally installed on the Earth face of the satellite.

In particularly advantageous embodiments of the invention, the electrical thrusters of the propulsion means are all compatible with the same electrical-thruster power units. They are preferably identical.

These electrical thrusters may be of the Hall-effect type, for example, well known to the person skilled in the art, it being understood that this example is in no way limiting on the invention.

In particular embodiments of the invention, the satellite comprises at least three electrical-thruster power units and an electrically interconnecting network connecting each of said electrical-thruster power units to at least one electrical thruster of the propulsion means of the satellite so that the electrical thruster of fixed orientation and two electrical thrusters of orientable thrust direction can be used simultaneously.

This third electrical-thruster power unit makes it possible to use for the propulsion of the satellite the simultaneous thrusts of two electrical thrusters of orientable thrust direction and the electrical thruster of fixed orientation. During the phase of transfer of the satellite from the initial orbit to the mission orbit, this makes it possible to reduce the time necessary for the transfer and therefore in particular to minimize the time of exposure of the satellite to radiation in the Van Allen belts, as well as the cost of the mission. This is advantageously effected by means of thrusters that are all of the same type and use the same fuel and therefore with satellite hardware of limited cost and weight.

This reduction of the duration of the orbit transfer phase is advantageously achieved by the use of hardware means (the electrical thruster of fixed orientation) that advantageously also constitute a redundancy solution vis a vis an electrical thruster of orientable thrust direction.

The satellite can comprise a number of electrical-thruster power units greater than three, for example four or five.

In particular embodiments of the invention, aiming to achieve one of the objectives fixed for the present invention, which is to ensure a high level of robustness of the satellite according to the invention in the event of failure(s), the propulsion means of the satellite comprise a first additional electrical thruster of orientable thrust direction disposed on a same face of the satellite as the first electrical thruster of orientable thrust direction and preferably adapted to be moved in the satellite frame of reference so as to orient its thrust direction appropriately for carrying out the phase of transfer of the satellite from the initial orbit into the mission orbit.

The propulsion means of the satellite preferably further comprise a second additional electrical thruster of orientable thrust direction disposed on the same face of the satellite as the second electrical thruster of orientable thrust direction and preferably adapted to be moved in the satellite frame of reference so as to orient its thrust direction appropriately for carrying out the phase of transfer of the satellite from the initial orbit into the mission orbit.

Thus, the satellite advantageously comprises two pairs of electrical thrusters of orientable thrust direction, preferably disposed on two different faces of the satellite, preferably on the faces called the north face and the south face of the satellite, respectively. A first pair of electrical thrusters of orientable thrust direction comprises the first electrical thruster of orientable thrust direction and the first additional electrical thruster of orientable thrust direction and a second pair of electrical thrusters of orientable thrust direction comprises the second electrical thruster of orientable thrust direction and the second additional electrical thruster of orientable thrust direction.

In such a configuration of the satellite according to the invention, entirely advantageous in terms of redundancy in the event of failure, in preferred embodiments of the invention the satellite comprises a third electrical-thruster power unit and an electrically interconnecting network connecting said third electrical-thruster power unit to the first additional electrical thruster of orientable thrust direction and to the second additional electrical thruster of orientable thrust direction.

The electrically interconnecting network therefore preferably connects:

a first electrical-thruster power unit to the first electrical thruster of orientable thrust direction and to the electrical thruster of fixed orientation, a second electrical-thruster power unit to the second electrical thruster of orientable thrust direction and to the electrical thruster of fixed orientation, and a third electrical-thruster power unit to the first additional electrical thruster of orientable thrust direction and to the second additional electrical thruster of orientable thrust direction.

Thus, with a limited number of electrical thrusters and a limited number of electrical-thruster power units, the satellite according to the invention has a high level of redundancy in the event of failure of one or more electrical thrusters and/or in the event of failure of one or more electrical-thruster power units.

Compared to prior art configurations in which the satellites are equipped with four electrical thrusters of orientable thrust direction and two electrical-thruster power units enabling simultaneous operation of two electrical thrusters, the combined use in accordance with particular embodiments of the present invention of a supplementary electrical thruster, of fixed orientation relative to the satellite and of thrust line passing through the center of mass of the satellite and substantially aligned with the axis Z, and of a third electrical-thruster power unit, makes it possible both to reduce the duration of the orbit transfer phase for moving the satellite into its mission orbit (by approximately one third) and to provide a high level of robustness in the event of failure either of an electrical thruster or of a electrical-thruster power unit, both during the transfer phase and during the satellite station keeping phase. In the event of a failure of a power unit, the duration of the transfer phase is simply reduced to that in the situation of operation with two electrical thrusters. This is achieved without greatly overloading the power system, the weight and the cost of the satellite.

The mission of the satellite is also robust in the event of a double failure, in particular the simultaneous failure of an electrical thruster of orientable thrust direction and of an electrical-thruster power unit, or the simultaneous failure of two thrusters of the same pair of electrical thrusters of orientable thrust direction. In the latter situation, the mission duration is only slightly worsened by a lower efficiency of the maneuvers (see below).

The satellite according to the invention may comprise a plurality of electrical thrusters of fixed orientation relative to the satellite, having a thrust line aligned with the axis Z and passing substantially through the center of mass of the satellite, disposed on a same face of said satellite.

In particular embodiments of the invention, the satellite comprises movement means for moving each of the electrical thrusters of orientable thrust direction of the propulsion means of the satellite in the satellite frame of reference.

In particular embodiments of the invention, these movement means are common to the electrical thrusters of orientable thrust direction disposed on a same face of said satellite.

The movement means for moving in the satellite frame of reference each of the electrical thrusters of orientable thrust direction can take the form of two-axis mechanisms on each of which is individually mounted an electrical thruster of orientable thrust direction, each of these mechanisms enabling orientation of the thrust line of the associated thruster in a chosen direction in the satellite frame of reference, generally substantially along the axis Z, for the orbit transfer phase, and closest to the axis Y, aiming approximately at the center of mass of the satellite, for satellite station keeping.

In particular embodiments of the invention, the movement means for moving each of said electrical thrusters of orientable thrust direction comprise two articulated arms each carrying an electrical thruster of orientable thrust direction and where applicable the additional electrical thruster of orientable thrust direction disposed on the same face of said satellite. Each of said articulated arms comprises at least three articulations each having at least one degree of freedom in rotation about a rotation axis.

The thrust force of each thruster, in particular the thrust direction and the point of application of the thrust force, is controlled by controlling the articulations of the articulated arm.

In the context of such an embodiment of the invention, the electrical thruster of fixed orientation according to the invention proves particularly useful in the event of simultaneous failure of two electrical thrusters of orientable thrust direction of a same pair carried by the same articulated arm or in the event of failure of an articulated arm. In fact, for station keeping maneuvers the fixed thruster then provides the missing component along the axis Z and the mission can continue with a single articulated arm. Likewise, during the transfer phase, the thrust can be applied by combining the thrust of the electrical thruster of fixed orientation and the thrust of the electrical thruster of orientable thrust direction that is still operational on the articulated arm. In this case, to maintain a thrust with no torque, the thrust of the electrical thruster of orientable thrust direction carried by the articulated arm is no longer aligned with that of the electrical thruster of fixed orientation. The angle between their thrusts is typically less than 50°, which leads to a loss of efficiency of less than 10%.

Another aspect of the present invention concerns a method of transferring a satellite according to the invention comprising one or more of the above features from an initial orbit, notably an injection orbit, into a mission orbit of said satellite around a celestial body, notably an Earth orbit and in particular a geostationary orbit. This method comprises a step of propulsion of said satellite by means simultaneously of the electrical thruster of fixed orientation relative to the satellite, with thrust line aligned with the axis Z and passing through the center of mass of the satellite, and at least one electrical thruster of orientable thrust direction.

This step is in particular carried out in the event of failure of a thruster of orientable thrust direction when the orbit transfer cannot be carried out in nominal mode, i.e. by simultaneous thrusts from two electrical thrusters of orientable thrust direction.

Even more particularly, when the satellite comprises at least three electrical-thruster power units and an electrically interconnecting network connecting each of said electrical-thruster power units to at least one electrical thruster of the propulsion means so that the electrical thruster of fixed orientation and two electrical thrusters of orientable thrust direction can be used simultaneously, the transfer method preferably comprises a step of propulsion of the satellite simultaneously by means of the electrical thruster of fixed orientation and at least two electrical thrusters of orientable thrust direction disposed on different faces of said satellite.

In particular embodiments of the invention, corresponding to a nominal operating mode, for said propulsion step the direction of thrust of each of the electrical thrusters used is substantially aligned with the axis Z.

The mission orbit of the satellite can for example be an Earth orbit, notably the geostationary orbit. For its part, the initial orbit is then preferably a low Earth orbit. The transfer of the satellite from the initial orbit into the mission orbit can be effected according to any simple or sophisticated trajectory that is conventional in itself.

Another aspect of the present invention concerns a method of orbit and attitude control of a satellite according to the invention having one or more of the above features in a mission orbit around a celestial body, notably an Earth orbit, in particular a geostationary orbit. This method comprises a step of propulsion of the satellite by the electrical thruster of fixed orientation relative to said satellite.

This step can be carried out separately or simultaneously with a step of propulsion by one or more electrical thrusters of orientable thrust direction. In particular it makes it possible to provide the eccentricity control. It can further be effected both in nominal mode and in failure more.

Another aspect of the invention is a method for remote control of a satellite according to the invention having one or more of the above features, for the execution of the steps of a method of transferring a satellite according to the invention and/or steps of a method of satellite orbit and attitude control according to the invention. According to this method, the satellite is remote-controlled by a control device, in particular one on the ground, control signals being successively determined and sent to the satellite by this control device to carry out said steps.

Another aspect of the invention concerns a control device that comprises means configured to control, preferably remotely, notably from the surface of the Earth, a satellite in accordance with the invention, having one or more of the above features, by transmission of successive control signals to said satellite, to carry out the steps of the method according to the invention for transferring the satellite from the initial orbit into the mission orbit and then the steps of the method according to the invention of orbit and attitude control of the satellite in the mission orbit.

This control, notably ground control, device is conventional in itself and may comprise one or more antennas for receiving signals from the satellite and transmitting command signals thereto. It may comprise computers and means for processing and storing data received from the satellite. The latter is in particular preferably equipped with a control module comprising in particular one or more processors slaved to a communication module cooperating with the control device.

The present invention also concerns a computer program product comprising a set of program code instructions which, when they are executed by a processor, execute a method of transferring a satellite according to the invention and/or a method of orbit and attitude control of a satellite according to the invention.

BRIEF DESCRIPTION OF THE DRAWINGS

The invention is described in more detail next in the context of preferred nonlimiting embodiments shown in FIGS. 1 to 6, in which.

DETAILED DESCRIPTION OF THE EMBODIMENTS

The invention is described hereinafter with reference to the particular nonlimiting example of a satellite 10 intended to be placed in geostationary orbit. However, there is nothing to exclude other examples concerning other types of spacecraft (space shuttle, orbital station, etc.), and/or other Earth orbits, for example geosynchronous orbits, Medium Earth Orbits (MEO), Low Earth Orbits (LEO), etc.

Figure 1:
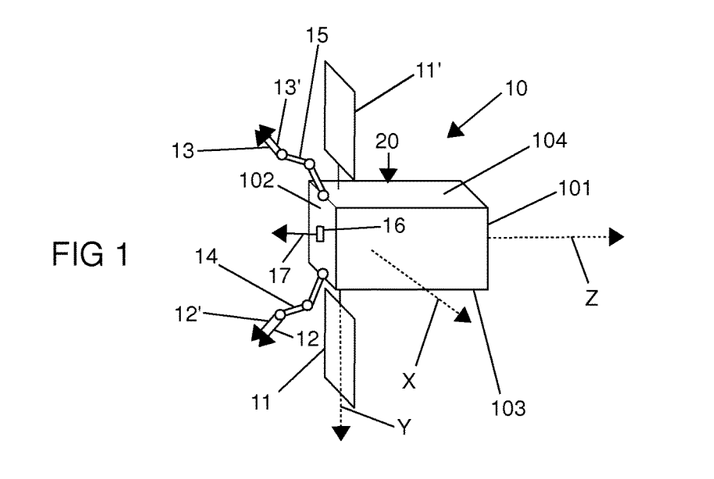
FIG. 1 represents schematically a satellite according to a particular embodiment of the invention.

A satellite 10 according to one particular embodiment of the invention is shown schematically in FIG. 1.

This satellite comprises, in a manner that is conventional in itself, a face called the Earth face 101 intended to face toward the Earth when the satellite is on station and an opposite anti-Earth face 102. The Earth face 101 generally carries the instruments of the payload of the satellite. The satellite 10 also has a face called the south face 103 and an opposite face called the north face 104.

The satellite 10 defines a satellite frame of reference comprising three axes X, Y and Z. In particular, the axis X is parallel to a speed vector of the satellite 10 in an inertial frame of reference, the axis Z is directed toward the center of the Earth when the satellite is in geostationary orbit, and the axis Y is orthogonal to the axes X and Z.

As shown in FIG. 1, the satellite 10 comprises for example a body 20 and two solar generators 11, 11' one on each side of the body 20. The two solar generators 11, 11' are for example mounted to be rotatable relative to the body 20 of the satellite 10, about a same rotation axis. A first solar generator 11 is deployed from the south face 103 of the satellite 10 and a second solar generator 11' is deployed from its north face 104.

The satellite 10 further comprises at least two electrical thrusters of orientable thrust direction carried in the case of one of them by the south face 103 of the satellite 10 and in the case of the second by its north face 104. The satellite 10 preferably comprises at least two pairs of electrical thrusters of orientable thrust direction carried in the case of the first pair by the south face 103 of the satellite 10 and in the case of the second pair by its north face 104. These thrusters are not shown in FIG. 1 but the associated thrust directions 12, 12' for the pair of thrusters carried by the south face 103 of the satellite 10 and 13, 13' for the pair of thrusters carried by its north face 104 are shown. In each pair, a thruster called the nominal thruster is generally used in nominal operation and a second thruster called the additional thruster provides redundancy in the event of failure of the nominal thruster.

Each pair of thrusters is carried by an articulated arm 14, 15, each of these arms 14, 15 comprising three articulations each having at least one degree of freedom in rotation about a rotation axis. One embodiment of such arms is described in more detail later in the present description.

The satellite 10 may comprise one or more additional electrical thrusters of orientable thrust direction.

The satellite 10 further comprises a thruster 16 of fixed orientation, the thrust line 17 of which, shown in FIG. 1, is substantially aligned with the axis Z, which is the axis intended to be directed toward the Earth when the satellite 10 is on station in the geostationary orbit, and it passes through the center of mass of the satellite 10 (not shown in this Figure).

It may further comprise one or more additional electrical thrusters of fixed orientation relative to the satellite.

All the electrical thrusters, whether of orientable thrust direction or of fixed orientation relative to the satellite 10, are preferably but not necessarily identical so that they can be powered and controlled by the same electrical power units.

These electrical thrusters can for example be of the Hall-effect type and each can have a power rating between 2.5 and 5 kW inclusive.

In a manner that is conventional in itself, the satellite 10 comprises a propellant tank, not shown in the Figures, adapted to receive a volume of propellant in gas form, for example xenon, for powering the electrical thrusters.

Figure 2:
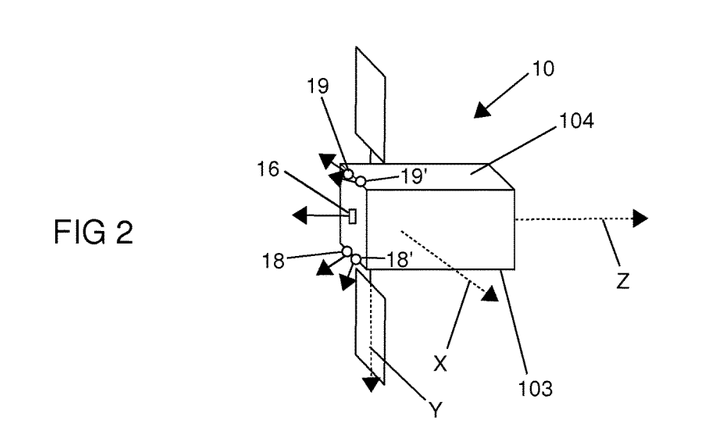
FIG. 2 represents schematically a satellite according to a different embodiment of the invention.

A variant satellite 10 according to the invention is shown schematically in FIG. 2. This satellite 10 is identical to that described above with reference to FIG. 1 except that the electrical thrusters of orientable thrust direction are each carried by an individual articulated arm 18, 18' in the case of the thrusters carried by the south face 103 of the satellite 10, and 19, 19' in the case of the thrusters carried by the north face 104 of the satellite 10, each of these arms comprising two articulations each having at least one degree of freedom relative to a rotation axis.

Each of these articulated arms 18, 18' and 19, 19' enables control of the orientation of the thrust direction of the associated electrical thruster of orientable thrust direction, in particular in the plane XZ, notably along the axis Z for a phase of transfer of the satellite 10 from an initial orbit to its geostationary mission orbit, and substantially along the axis Y for station keeping maneuvers in that orbit.

Figure 3:
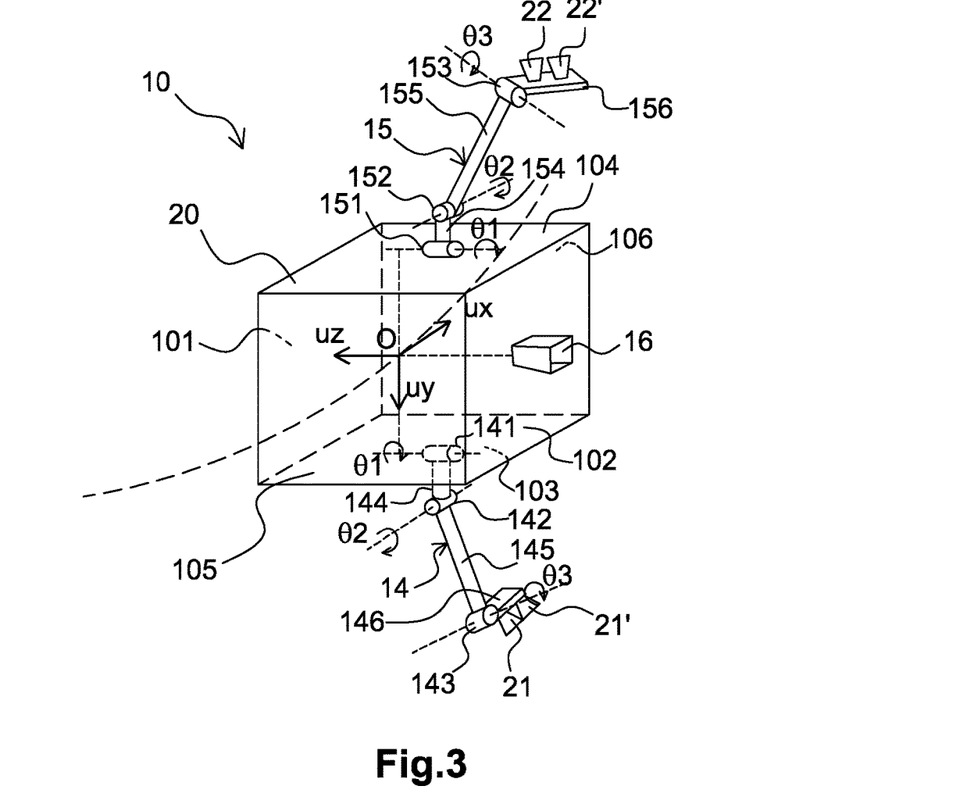
FIG. 3 represents schematically a satellite according to a preferred embodiment of the invention.

FIG. 3 shows a more detailed representation of a satellite according to one particularly advantageous embodiment of the invention.

For the purposes of the description of this Figure there is associated with the satellite 10 a satellite frame of reference centered on a center of mass O of the satellite 10 and comprising three axes X, Y, Z. In particular the axis X is parallel to a speed vector of the satellite 10 in an inertial frame of reference, the axis Z is directed toward the center of the Earth, and the axis Y is orthogonal to the axes X and Z. Each of the axes X, Y and Z of the satellite frame of reference is associated with a respective unit vector ux, uy and uz. The unit vector ux corresponds to the speed vector normalized by the norm of said speed vector, the unit vector uz is oriented from the center of mass O of the satellite 10 toward the center of the Earth, and the unit vector uy is oriented so that the set (ux, uy, uz) constitutes a direct orthonormal basis of the satellite frame of reference.

In the remainder of the description, without this being limiting on the invention, we consider the situation in which the body 20 of the satellite 10 is substantially of rectangular parallelepiped shape. The body 20 therefore has six faces parallel in pairs.

The nonlimiting situation is also one in which the attitude of the satellite 10 is controlled, for the purposes of the mission of said satellite 10, so as to be placed in a set point attitude, called the "mission attitude", in which:
  a face 101 of the body 20 of the satellite 10 called the Earth face 101, carrying for example an instrument of a payload of said satellite 10 is directed toward the Earth and is substantially orthogonal to the axis Z; the face 102 opposite the Earth face, thus on the side away from the Earth, is called the anti-Earth face 102;
  the two opposite faces of the body 20 of the satellite 10 carrying the two solar generators 12, respectively called the south face 103 and the north face 104, are substantially orthogonal to the axis Y; and
  the final two opposite faces 105 and 106 of the body 20 of the satellite 10 are substantially orthogonal to the axis X.

The satellite 10 also comprises a set of actuators adapted to control the orbit and the attitude of said satellite 10 and a control device (not shown in the Figures) for controlling said actuators.

For the purposes of attitude control the satellite 10 preferably comprises an angular momentum storage device.

The satellite 10 further comprises propulsion means comprising a set of electrical thrusters, more particularly:
  an electrical thruster 16 of fixed orientation relative to the satellite 10 disposed on the anti-Earth face 102 of the satellite 10 and the thrust line of which is substantially aligned with the axis Z and passes through the center of mass O of the satellite; and
  two pairs of electrical thrusters of orientable thrust direction: a first pair of electrical thrusters 21, 21' is carried by the south face 103 of the satellite 10 and a second pair of electrical thrusters 22, 22' is carried by the north face 104 of the satellite.

The point at which the thruster 16 of fixed orientation is fixed to the anti-Earth face 102 of the satellite 10 substantially corresponds to the orthogonal projection of the theoretical center of mass of the satellite 10 onto said anti-Earth face 102. The moment applied to the satellite 10 by the thruster 16 of fixed orientation is therefore substantially zero if the real center of mass O of the satellite 10 is near the theoretical center of mass. Note that the satellite 10 can, in accordance with other examples, comprise a plurality of thrusters 16 of fixed orientation relative to the satellite 10.

The thruster 16 of fixed orientation can be used for the transfer of the satellite 10 from the initial orbit into its geostationary mission orbit or, when on station, to control the eccentricity of the orbit. It can be activated simultaneously with the electrical thrusters 21, 21', 22, 22' and/or during dedicated eccentricity control maneuvers, separate from the N/S and E/W orbit control maneuvers.

Each pair of electrical thrusters 21, 21' and 22, 22' of orientable thrust direction is associated with movement means for moving said thrusters in the satellite frame of reference adapted to control simultaneously the inclination and the longitude of the orbit of the satellite 10. More particularly, these movement means are adapted:
  to modify angles between a thrust direction of each thruster and the axes X, Y, respectively, of the satellite frame of reference,
  to move each thruster, at constant thrust direction in the satellite frame of reference, so as to form a moment about any axis in a plane orthogonal to said thrust direction (comprising a zero moment by aligning the thrust direction with the center of mass O of the satellite 10).

The orbit of the satellite 10 is controlled by a control device of the satellite 10 by controlling the propulsion means and the movement means in accordance with a maneuver plan comprising orbit control maneuvers during which the propulsion means are activated.

With movement means of this kind, it is clear that it is possible, during a same orbit control maneuver and with a same thruster, to control the thrust direction of said thruster so as to control simultaneously the inclination of the orbit (by adjusting the component of the thrust direction along the axis Y) and the longitude of the orbit (by adjusting the component of the thrust direction along the axis X).

In the example illustrated by FIG. 3, the movement means comprise two articulated arms 14, 15, each articulated arm 14, 15 carrying two electrical thrusters 21, 21' and 22, 22'.

In the nonlimiting example illustrated by FIG. 3, the articulated arms 14, 15 are respectively on the south face 103 and the north face 104 of the body 20 of the satellite 10. The articulated arms 14, 15 are for example respectively used for the south control and the north control of the inclination of the orbit of the satellite 10 by activating alternately either a thruster 21, 21' or a thruster 22, 22'.

The articulated arm 14 is preferably fixed to the south face 103 at a fixed point that is offset along the axis Z relative to the orthogonal projection of the theoretical center of mass O of the satellite 10 onto said south face 103. Likewise, the articulated arm 15 is preferably fixed to the north face 104 at a fixed point that is offset along the axis Z relative to the orthogonal projection of the theoretical center of mass O of the satellite 10 onto said north face 104. In this configuration the thrust force of the electrical thrusters 21, 21' and 22, 22' of orientable thrust direction includes in north/south control a component along the axis Z without producing any moment. Such a configuration is however in no way limiting on the invention.

Each of the two articulated arms 14, 15 comprises at least three articulations 141, 142, 143 and 151, 152, 153, respectively. Each of these articulations has at least one degree of freedom in rotation about a rotation axis. The articulations 141 and 142, and 151 and 152 are connected to one another by a respective connection 144 and 154 and the articulations 142 and 143 and 152 and 153 are connected to one another by a respective connection 145 and 155.

A plate 146, 156 extends from the respective articulation 143, 153 at the end of each articulated arm 14, 15 and carries the respective electrical thrusters 21, 21' and 22, 22'.

Each articulated arm 14, 15 offers three degrees of freedom for modifying relative to the N/S control position the thrust direction and the point of application of the thrust force of the electrical thrusters that it carries. To this end the control device controls the angles of rotation of the articulations 141, 151, 142, 152 and 143, 153 respectively designated θ1, θ2 and θ3.

The various electrical thrusters of the satellite 10 according to the invention can be used both for the phase of transfer of the satellite from an initial orbit, in particular an injection orbit into which it has been injected by a launch vehicle, into its geostationary mission orbit and for orbit and attitude control of the satellite when on station.

Figure 4:
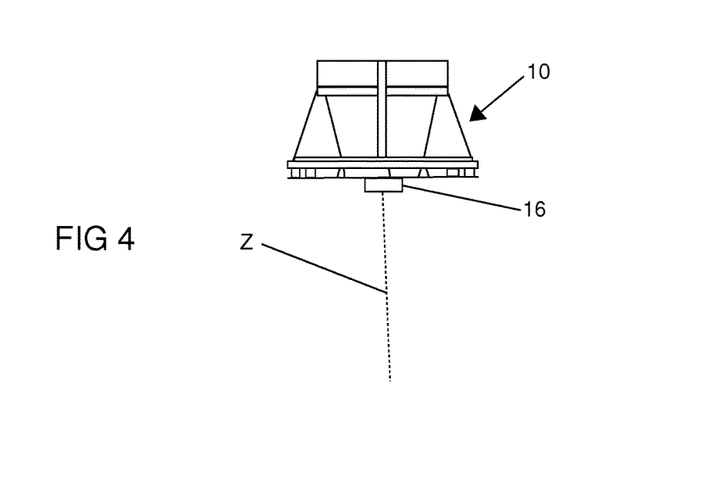
FIG. 4 is a partial view of a satellite according to a particular embodiment of the invention showing the operation of the electrical thruster of fixed orientation.

For all these phases, the electrical thruster 16 of fixed orientation relative to the satellite 10 produces a thrust of fixed direction, substantially aligned with the axis Z of the satellite, as indicated schematically in FIG. 4.

This electrical thruster 16 of fixed orientation can be used during the orbit transfer phase in nominal operation in order to reduce the transfer time or in the event of failure of one or more thrusters 21, 21', 22, 22' of orientable thrust direction.

It can also be used for orbit and attitude control of the satellite 10 when on station in the geostationary orbit, notably for the eccentricity control maneuvers in nominal operation or in the event of a failure, in particular in the event of failure of a pair of electrical thrusters 21, 21' or 22, 22' of orientable thrust direction or of failure of one of the articulated arms 14, 15. The electrical thruster 16 of fixed orientation therefore makes it possible to compensate the thrust along the axis Z created by the electrical thrusters of orientable thrust direction that are still operational.

The electrical thrusters 21, 21', 22, 22' of orientable thrust direction can be used both for the orbit transfer phase and for the phase of orbit and attitude control of the satellite 10. To this end they are moved in the satellite frame of reference so as to orient their thrust direction appropriately, for example along the axis Z, in the same direction.

Figure 5A:
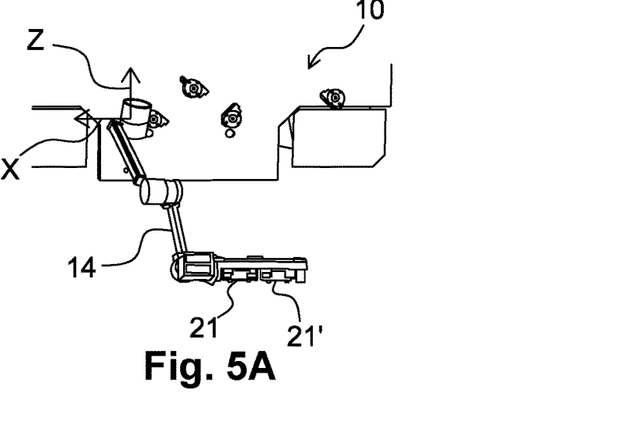
FIG. 5A is a partial view of a satellite according to a particular embodiment of the invention in an orbit transfer configuration for placing the satellite in its mission orbit.
Figure 5B:
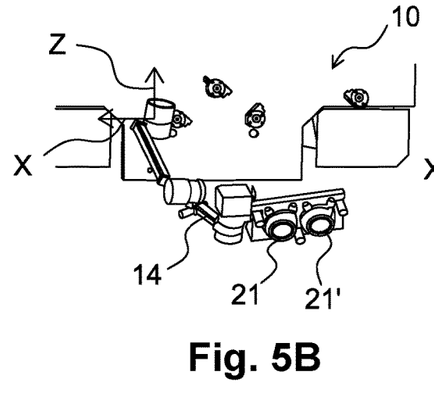
FIG. 5B is a partial view of the satellite of FIG. 5A in a north/south maneuvers configuration.

FIGS. 5A and 5B show examples of positioning the electrical thrusters 21, 21' of orientable thrust direction carried by the articulated arm 14. For the orbit transfer phase or for certain orbit and attitude control maneuvers of the satellite 10, as shown in FIG. 5A, the electrical thrusters 21, 21' are placed in a configuration in which they are able to exert a thrust along the axis Z. For some orbit and attitude control maneuvers of the satellite 10, as shown in FIG. 5B, the electrical thrusters 21, 21' are placed in a configuration in which they are able to exert a thrust in a different direction in the satellite frame of reference.

The satellite 10 further comprises at least two electrical-thruster power units, called PPU in the remainder of the present description, which are conventional in themselves. It preferably comprises at least three PPU 24, 25, 26, and an electrically interconnecting network 23 one embodiment of which is shown in FIG. 6, which connects each of these PPU to one or more electrical thrusters of the satellite 10.

Figure 6:
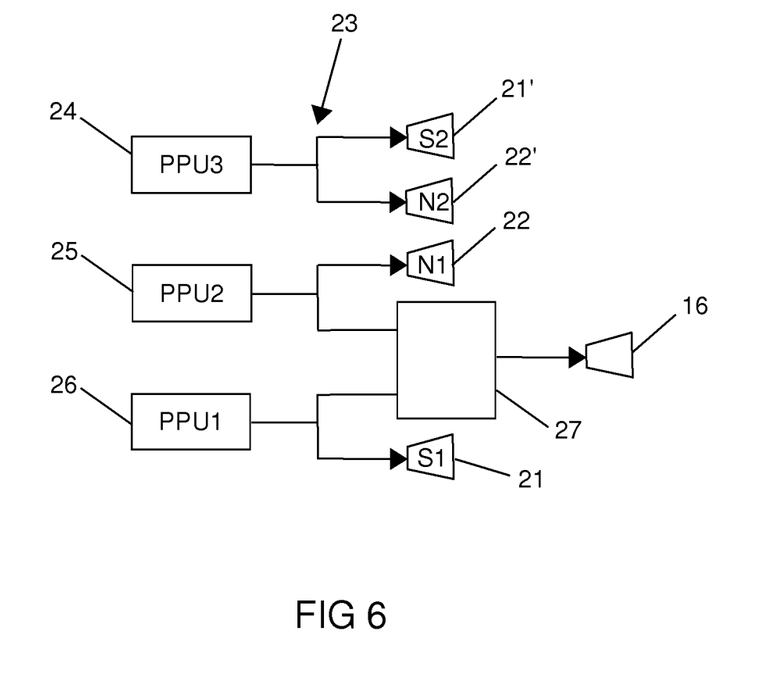
FIG. 6 is a diagram showing the electrically interconnecting network of a satellite according to a particular embodiment of the invention.

In the particularly advantageous embodiment shown in FIG. 6 the electrically interconnecting network 23 interconnects the following components:

a first electrical-thruster power unit 26, called PPU1, is connected on the one hand to the nominal thruster 21 of the first pair of electrical thrusters of orientable thrust direction, called S1, and on the other hand to the electrical thruster 16 of fixed orientation; a switch, not shown in the Figure, enables the power unit PPU1 26 to power either the electrical thruster S1 21 or the electrical thruster 16 of fixed orientation;

a second electrical-thruster power unit 25, called PPU2, is connected on the one hand to the nominal thruster 22 of the second pair of electrical thrusters of orientable thrust direction, called N1, and on the other hand to the electrical thruster 16 of fixed orientation; a switch, not shown in the Figure, enables the power unit PPU2 25 to power either the electrical thruster N1 22 or the electrical thruster 16 of fixed orientation; and a third electrical-thruster power unit 24, called PPU3, is connected on the one hand to the additional thruster 21' of the first pair of electrical thrusters of orientable thrust direction, called S2, and on the other hand to the additional thruster 22' of the second pair of electrical thrusters of orientable thrust direction, called N2; a switch, not shown in the Figure, enables the power unit PPU3 24 to power either the electrical thruster S2 21' or the electrical thruster N2 22'.

The PPU and the electrical thrusters are connected by means of electrical wiring conventional in itself.

A relay box 27, also conventional in itself, is disposed upstream the electrical thruster 16 of fixed orientation on the power paths from the power unit PPU1 26 and the power unit PPU2 25 to enable powering of the electrical thruster 16 of fixed orientation either from the first PPU1 26 or from the second PPU2 25.

The satellite 10 having the above features is advantageously particularly highly robust and able to adapt easily to a large number of diverse failures, comprising double failures, so that its operation, in particular the duration of its mission, is not or not much impacted by failures, this being achieved with a relatively low difference of mass and of cost relative to prior art satellites. This advantage is combined with that of the reduced duration of the orbit transfer phase, from the injection orbit to the geostationary orbit, which in particular makes it possible to minimize the time of exposure of the satellite 10 to the radiation of the Van Allen belts.

To carry out orbit transfer phases and orbit and attitude control phases the satellite 10 can be controlled remotely by a control device, in particular on the ground, in a manner that is conventional in itself.

This remote control device is configured to control the various phases executed by the satellite 10. To this end, the control device and the satellite 10 each comprise conventional telecommunication means.

The control device is adapted to determine control signals that are sent to the satellite 10. For example, these control signals are determined as a function of measurement signals received from the satellite 10, which are determined by various sensors (gyroscope, star sensor, etc.) of the latter.

The satellite 10 comprises for example at least one processor and at least one electronic memory in which is stored a computer program product in the form of a set of program code instructions intended to be executed to carry out the various steps of a method of controlling the satellite 10.

A variant of the control device also comprises one or more programmable logic circuits of FPGA, PLD, etc. type and/or application-specific integrated circuits (ASIC) adapted to execute some or all of said steps of the control method. In other words, the control device comprises a set of means configured in software (dedicated computer program product) and/or hardware (FPGA, PLD, ASIC, etc.) to execute the various steps of a method of transfer of the satellite 10 from the injection orbit into the mission orbit, then of a method of orbit and attitude control of the satellite 10 in the mission orbit.

The invention claimed is:

1. A satellite configured to be stationed in a mission orbit around a celestial body, comprising:
   an Earth face configured to be disposed facing the Earth when the satellite is on a station and an opposite anti-Earth face, the satellite defining a satellite frame of reference centered on a center of mass of the satellite and the satellite frame of reference comprising three axes X, Y and Z, the axis Z configured to be directed towards the Earth when the satellite is on the station;
   a propulsion device comprising a first electrical thruster of orientable thrust direction and a second electrical thruster of orientable thrust direction;
   at least two electrical-thruster power units and an electrically interconnecting network connecting a first electrical-thruster power unit to the first electrical thruster of orientable thrust direction and connecting a second electrical-thruster power unit to the second electrical thruster of orientable thrust direction;
   wherein the propulsion device further comprises an electrical thruster of fixed orientation relative to the satellite, the electric thruster of fixed orientation having a thrust line aligned with an axis Z and passing through the center of mass of the satellite; and
   wherein the electrically interconnecting network connects each electrical-thruster power unit to the electrical thruster of fixed orientation so that each electrical-thruster power unit is configured to supply power to either an associated electrical thruster of orientable thrust direction or the electrical thruster of fixed orientation.

2. The satellite as claimed in claim 1, wherein the electrical thruster of fixed orientation is disposed on the anti-Earth face of the satellite.

3. The satellite as claimed in claim 1, further comprising at least three electrical-thruster power units; and wherein the electrically interconnecting network connects each electrical-thruster power unit to at least one electrical thruster of the propulsion device so that the electrical thruster of fixed orientation, and first and second electrical thrusters of orientable thrust direction can be used simultaneously.

4. The satellite as claimed in claim 1, further comprising a plurality of electrical thrusters of fixed orientation relative to the satellite, with thrust lines aligned with the axis Z and passing substantially through the center of mass of the satellite, disposed on a same face of the satellite.

5. The satellite as claimed in claim 1, wherein the electrical thrusters of the propulsion device are all compatible with the electrical-thruster power units.

6. The satellite as claimed in claim 1, wherein the propulsion device further comprises a first additional electrical thruster of orientable thrust direction disposed on a same face of the satellite as the first electrical thruster of orientable thrust direction.

7. The satellite as claimed in claim 6, wherein the propulsion device further comprises a second additional electrical thruster of orientable thrust direction disposed on a same face of the satellite as the second electrical thruster of orientable thrust direction.

8. The satellite as claimed in claim 7, further comprising a third electrical-thruster power unit; and wherein the electrically interconnecting network connects the third electrical-thruster power unit to the first additional electrical thruster of orientable thrust direction and to the second additional electrical thruster of orientable thrust direction.

9. The satellite as claimed in claim 1, further comprising a movement device to move each of the first electrical thruster and the second electrical thruster in the satellite frame of reference.

10. The satellite as claimed in claim 9, wherein the movement device is common to the first electrical thruster and the second electrical thruster disposed on a same face of the satellite.

11. The satellite as claimed in claim 9, wherein the movement device comprises two articulated arms, each articulated arm carrying one of the first electrical thruster and the second electrical thruster, and each articulated arm comprising at least three articulations, each articulation having at least one degree of freedom in rotation about a rotation axis.

12. The satellite as claimed in claim 11, wherein each articulated arm carries an additional electrical thruster of orientable thrust direction disposed on a same face of the satellite as an electrical thruster of orientable thrust direction associated with said each articulated arm.

13. A method of transferring the satellite as claimed in claim 1 from an initial orbit into the mission orbit around the celestial body by connecting each electrical-thruster power unit to the electrical thruster of fixed orientation by the electrically interconnecting network so that the electrical thruster of fixed orientation and at least one electrical thruster of orientable thrust direction can be used simultaneously; and propelling the satellite by simultaneously using the electrical thruster of fixed orientation relative to the satellite and said at least one electrical thruster of orientable thrust direction.

14. The method as claimed in claim 13, wherein the satellite comprises at least three electrical-thruster power units; and comprising steps of:
   connecting each electrical-thruster power unit to at least one electrical thruster of the propulsion device by the electrically interconnecting network so that the electrical thruster of fixed orientation and two electrical thrusters of orientable thrust direction can be used simultaneously; and
   propelling the satellite by simultaneously using the electrical thruster of fixed orientation and at least two electrical thrusters of orientable thrust direction disposed on different faces of the satellite.

15. A method for a remote control of the satellite to perform the steps of the method of transferring the satellite as claimed in claim 13, wherein the satellite is remote-controlled by a control device, control signals are successively determined and sent to the satellite by the control device.

16. A computer program product recorded on a non-transitory media comprising program code instructions executable by a processor to perform the method of transferring the satellite as claimed in claim 13.

17. A method of orbit and attitude control of the satellite as claimed in claim 1 in the mission orbit around the celestial body by propelling the satellite by the electrical thruster of fixed orientation relative to the satellite.

18. A method for a remote control of the satellite to perform the step of the orbit and attitude control of a satellite as claimed in claim 17, wherein the satellite is remote-controlled by a control device, control signals are successively determined and sent to the satellite by the control device.

19. A computer program product recorded on a non-transitory media comprising program code instructions executable by a processor to perform the method of orbit and attitude control of the satellite as claimed in claim 17.

\* \* \* \* \*